United States Patent [19]

Braun et al.

[11] Patent Number: 4,830,862

[45] Date of Patent: May 16, 1989

[54] CALCIUM-SUPPLEMENTED BEVERAGES AND BEVERAGE CONCENTRATES CONTAINING LOW LEVELS OF SULFATE

[75] Inventors: Steven D. Braun; Timothy W. Dake, both of Cincinnati; Chee-Hway Tsai, West Chester, all of Ohio

[73] Assignee: The Procter & Gamble Company, Cincinnati, Ohio

[21] Appl. No.: 80,521

[22] Filed: Jul. 31, 1987

[51] Int. Cl.$^4$ .................................................. A23L 2/02
[52] U.S. Cl. ...................................... 426/74; 426/599
[58] Field of Search ......................... 426/74, 590, 599

[56] References Cited

U.S. PATENT DOCUMENTS

| | | |
|---|---|---|
| 2,297,599 | 9/1942 | Wilen . |
| 3,030,213 | 4/1962 | Tidridge et al. . |
| 3,114,641 | 12/1963 | Sperti et al. . |
| 3,657,424 | 4/1972 | Aktins et al. . |
| 3,949,098 | 4/1976 | Bangert . |
| 4,093,750 | 6/1978 | Babayan . |
| 4,322,407 | 3/1982 | Ko . |
| 4,325,975 | 4/1982 | Lindon et al. . |
| 4,384,005 | 5/1983 | McSweeney . |
| 4,448,770 | 5/1984 | Epting . |
| 4,551,342 | 11/1985 | Nakel ................................ 426/590 |
| 4,592,909 | 6/1986 | Winer et al. . |
| 4,722,847 | 2/1988 | Heckert .............................. 426/74 |

FOREIGN PATENT DOCUMENTS 2095530 10/1982 United Kingdom .

Primary Examiner—Donald E. Czaja
Assistant Examiner—Carolyn Paden
Attorney, Agent, or Firm—Eric W. Guttag; T. David Reed; Rose Ann Dabek

[57] ABSTRACT

Beverages and beverage concentrates nutritionally supplemented with significant levels of solubilized calcium and containing low levels of sulfate, preferably in combination with low levels of chloride, are disclosed. These beverages and concentrates also contain specified levels of edible acids selected from phosphoric acid, citric acid, malic acid, fumaric acid, adipic acid, gluconic acid, and lactic acid, as well as mixtures of these acids. The particular acid systems are selected to provide the desired flavor and sourness character for the beverages and concentrates. Inclusion of low levels of sulfate/chloride in these beverages and concentrates provides a quicker onset of sourness, prevents or reduces aftertaste effects and improves the solubility of the calcium, particularly when high levels of phosphoric acid or citric acid are used. Inclusion of sulfate/chloride also prevents or reduces the precipitation and deposition of calcium salts on equipment surfaces during the pasteurization or sterilization of calcium-containing fruit juice beverages.

35 Claims, No Drawings

CALCIUM-SUPPLEMENTED BEVERAGES AND BEVERAGE CONCENTRATES CONTAINING LOW LEVELS OF SULFATE

TECHNICAL FIELD

This application relates to beverages and beverage concentrates for preparing same which are nutritionally supplemented with significant levels of calcium. This application particularly relates to calcium-supplemented beverages and beverage concentrates which contain low levels of sulfate, preferably in combination with low levels of chloride.

Dietary calcium inadequacy may be a contributing cause to osteoporosis, at least for some pupulations. For example, a positive correlation between calcium intake and bone mass has been found across many age groups. It has also been suggested that the level of calcium intake early in life directly influences the peak bone mass achieved at skeletal maturity.

During the period of late tennage to young adulthood, it has been found that a significant reduction in dietary calcium intake typically occurs. This is especially true of the female population where reduced dietary calcium intake usually happens much earlier in life compared to their male counterparts. Accordingly, females, as a class, are especially susceptible to a prolonged calcium deficit over their life span. This calcium deficit may be one reason for the greater incidence of osteoporosis in postmenopausal women.

Calcium can be obtained from a variety of dietary sources. The primary sources of calcium are dairy products, in particular milk. Milk provides a very valuable source of dietary calcium. However, beginning in young adulthood and continuing through later life, milk is typically not consumed in sufficient quantities by the general population to obtain needed levels of calcium. This may be caused by the unattractiveness of milk as a drink for "social occasions." Indeed, it has been found that teenage girls, and especially young adult women, generally find milk to be a socially unattractive drink, as well as too caloric and unappealing in taste.

To achieve greater consumption of calcium, a more appealing alternative to milk is apparently needed. This alternative must be one which is consumed in sufficient quantities to provide nutritionally beneficial amounts of calcium. Products which are consumed in great quantities by teenagers and young adults are carbonated soft drinks. Unlike milk, soft drinks can be formulated with a variety of flavors generated by natural flavor oils, flavor extracts and synthetically derived flavor materials, which may be the reason why soft drinks are very attractive to this particular group. Beverages which are consumed often by the general public, especially at breakfast, are fruit juice products, particularly orange juice. Like milk, orange juice has a wholesome, nutritional image, but is generally considered to have a more appealing taste. Accordingly, soft drinks or fruit juice products nutritionally supplemented with calcium could be viewed as potential vehicles for achieving greater dietary calcium intake during this critical teenage/young adult period, and throughout life as well.

Nutritional supplementation of soft drinks, or other non-milk beverages like fruit juice, with significant levels of calcium is not straight forward. Milk contains on average, about 0.12% calcium by weight. Inclusionof such a high level of calcium in a soft drink or other non-milk beverage requires consideration of a number of issues.

One is making sure that the calcium supplemented drink has desirable taste and mouthfeel qualities. It has been found that high levels of calcium can impart significant "chalky" mouthfeel sensations to a soft drink. This has been found to be especially true for soft drinks based on high levels of citric acid as the acidulant. In addition, it has been found that high levels of calcium can cause undesirable "biting/burning" mouthfeel sensations long after the soft drink is consumed. This "aftertaste" problem is especially true of soft drinks based on high levels of phosphoric acid as the acidulant.

Another factor which must be considered is the sourness impression of the soft drink. Calcium-containing soft drinks based on high levels of edible acids such as citric acid or phosphoric acid typically have a slower, more lingering onset of sourness. This is due to the ability of these acids to buffer the soft drink to a relatively high, though acidic pH. A quicker onset of sourness is usually desirable for certain soft drinks, in particular those having a cola-type flavor.

Another potential issue is precipitation of insoluble calcium salts such as calcium citrate and calcium phosphate. Stability against precipitation is a very significant problem for beverage concentrates used to prepare soft drinks or other non-milk beverages like fruit juice because of the very high levels of calcium salts present. However, at even moderate concentrations in drinkable beverages, stability against precipitation of insoluble calcium salts can be important, especially on equipment surfaces during pasteurization or sterilization of calcium-containing fruit juice beverages.

BACKGROUND ART

U.S. Pat. No. 4,325,975 to Lindon et al, issued Apr. 20, 1982, discloses mineralized drinking water formulations consisting essentially of strontium ions (20-40 milligrams per liter), magnesium ions (50-100 milligrams per liter), calcium ions (60-125 milligrams per liter), and lithium ions (0.06 to 0.15 milligrams per liter). These ions are added to distilled water in the form of water soluble salts such as the sulfates, nitrates or chlorides.

U.S. Pat. No. 4,448,770 to Epting, issued May 15, 1984, discloses a dietetic beverage containing, per gallon, 30 to 50 milliequivalents of potassium ion, 5 to 10 milliequivalents of calcium ion, 1 to 3 milliequivalents of magnesium ion, and 5 to 10 ounces of sucrose. Suitable potassium salts include the sulfate, citrate, and preferably chloride salts. Suitable calcium salts include the chloride and preferably gluconate salts. The magnesium ion is preferably supplied as the magnesium chloride salt.

U.S. Pat. No. 4,322,407 to Ko, issued Mar. 30, 1982, discloses an electrolyte drink containing sodium, potassium, magnesium, chloride, sulfate, phosphate, citrate, sucrose, dextrose, ascorbic acid and pyridoxine.

U.S. Pat. No. 4,384,005 to McSweeney, issued May 17, 1983, discloses compressed tablets which rapidly dissolve in water. These tablets can be used in beverage preparation. One such tablet (Example 4) is prepared from citric acid (580 grams), malic acid (70 grams), an aqueous moistener (56 grams), corn syrup solids (55 grams), dextrin (25 grams), and calcium sulfate (20 grams).

U.S. Pat. No. 2,297,599 to Wilen, issued Sept. 29, 1942, discloses effervescent tablets consisting of an effervescent core and an outer layer containing a therapeutic active together with an effervescent base. One such effervescent alkalizing tablet contains calcium gluconate, sodium bicarbonate, potassium bicarbonate, magnesium sulfate, sodium chloride and an effervescent base of sodium bicarbonate, citric acid and tartaric acid.

DISCLOSURE OF THE INVENTION

The present invention relates to beverages, and beverage concentrates for preparing same, which are nutritionally supplemented with significant levels of calcium. The beverages of the present invention comprise:
(a) from about 0.05 to about 0.15% by weight solubilized calcium;
(b) from about 0.07 to about 1% by weight of an edible acid component;
(c) from about 0.02 to about 0.14% by weight sulfate;
(d) up to about 0.05% by weight chloride;
(e) the amount of sulfate and chloride combined being up to about 0.14% by weight;
(f) an effective amount of a flavor component; and
(g) an effective amount of a sweetener.
For the beverage concentrates of the present invention, the level of solubilized calcium is from about 0.15 to about 0.75% by weight, the level of the acid component is from about 0.2 to about 5% by weight, the level of sulfate is from about 0.06 to about 0.7% by weight, the level of chloride is up to about 0.25% by weight and the level of sulfate and chloride combined up to about 0.7% by weight.

The present invention further relates to fruit juice beverages which are nutritionally supplemented with significant levels of calcium. These fruit juice beverages comprise:
(a) from about 0.05 to about 0.26% by weight solubilized calcium;
(b) from about 0.4 to about 4% by weight of an edible acid component;
(c) from about 0.02 to about 0.1% by weight sulfate;
(d) up to about 0.07% by weight chloride;
(e) the amount of sulfate and chloride combined being up to about 0.12% by weight;
(f) at least about 45% fruit juice; and
(g) a sugar content of from about 2 to about 16° Brix.
For fruit juice concentrates of the present invention, the level of solubilized calcium is from about 0.15 to about 1.30% by weight, the level of the acid component is from about 1.2 to about 20% by weight, the level of sulfate is from about 0.06 to about 0.5% by weight, the level of chloride is up to about 0.35% by weight, the level of sulfate and chloride combined is up to about 0.6% by weight, and the sugar content is from about 6 to about 75° Brix.

The fruit juice and other beverages of the present invention supply significant levels of nutritionally beneficial calcium. Inclusion of low levels of sulfate (preferably in combination with low levels of chloride) improves the solubility of calcium in these beverages, and especially concentrtes for preparing these beverages, even when they contain high levels of citric acid or phosphoric acid. Certain of these beverages also have a quicker onset of sourness, even when acid systems such as citric acid or phosphoric acid are used, as well as reduced aftertaste. In addition, the sulfate/chloride reduces or prevents the precipitation and depositing of calcium salts on equipment surfaces during pasteurization or sterilization of calcium-containing fruit juice beverages.

A. Definitions

As used herein, the term "beverage" refers to a beverage composition which is in a single-strength, ready-to-serve, drinkable form. Beverages of the present invention typically comprise at least 80% (preferably at least 85%) water. Beverages contemplated within the scope of the present invention include both carbonated and noncarbonated forms.

As used herein, the term "beverage concentrate" refers to a beverage composition in liquid form used to prepare a drinkable beverage. Sugar-sweetened beverage concentrates within the scope of the present invention typically comprise from 30 to 70% (preferably from 40 to 60%) water. They are usually formulated to provide drinkable beverages when diluted with 2 to 4 parts by weight water.

As used herein, the term "beverage syrup" refers to a beverage concentrate which further comprises sugar. Beverage syrups typically comprise from 30 to 70% by weight sugar.

As used herein, the term "fruit juice product" refers to both fruit juice beverages and fruit juice concentrates which comprise at least about 45% fruit juice.

As used herein, the term "fruit juice beverage" refers to a fruit juice product which is in a single-strength, ready-to-serve, drinkable form. Fruit juice beverages of the present invention can be of the "full-strength" type which typically comprise at least about 95% fruit juice.

Fruit juice beverages within the scope of the present invention also include extended juice products which are referred to as "nectars." These extended juice products typically comprise from about 50 to about 90% fruit juice. Preferred extended juice products comprise from about 50 to about 70% fruit juice.

As used herein, the term "fruit juice concentrate" refers to a fruit juice product which, when diluted with the appropriate amount of water, forms drinkable fruit juice beverages. Fruit juice concentrates within the scope of the present invention are typically formulated to provide drinkable beverages when diluted with 2 to 4 parts by weight water.

As used herein, the term "concentrated fruit juice" refers to fruit juice from which a portion of the water has been removed.

As used herein, the term "fruit juice materials" refers to concentrated fruit juice, plus other fruit juice materials such as fruit juice aroma and flavor volatiles, peel oils, and pulp or pomace.

As used herein, the term "fruit juice" refers to citrus juices, noncitrus juices such as apple juice, grape juice, pear juice, cherry juice, berry juice, pineapple juice, peach juice, apricot juice, plum juice, prune juice, passion fruit juice, banana juice, and mixtures of these juices.

As used herein, the term "citrus juice" refers to fruit juices selected from orange juice, lemon juice, lime juice, grapefruit juice, tangerine juice and mixtures thereof.

As used herein, the term "comprising" means various components can be conjointly employed in the beverages and beverage concentrates of the present invention. Accordingly, the term "comprising" encompasses the more restrictive terms "consisting essentially of" and "consisting of."

All amounts of fruit juice referred to herein are on a single-strength basis.

B. Calcium Levels, Acid Systems and Sulfate/Chloride Levels

The key nutritional component of the beverages and beverage concentrates of the present invention is calcium. Suitable sources of calcium include calcium carbonate, calcium sulfate, calcium chloride, calcium phosphate, calcium hydrogen phosphate and calcium dihydrogen phosphate, calcium hydroxide, as well as the respective sour salts of calcium, e.g., calcium citrate, calcium malate, calcium gluconate or calcium lactate. Mixtures of calcium carbonate (or calcium hydroxide) and calcium sulfate, which optionally and preferably include calcium chloride and/or calcium gluconate, are particularly preferred calcium sources. To be useful in the present invention, the calcium needs to be "solubilized", i.e., dissolved or suspended, in the beverage or beverage concentrate. Accordingly, the amount of calcium included in the beverages and beverage concentrates of the present invention will be referred to in terms of "solubilized calcium", i.e., the amount of calcium ion dissolved or suspended.

For beverages of the present invention, calcium is present in an amount of at least 0.05% by weight. This minimum level of calcium (about half of milk level) provides significant nutritional supplementation for the beverage. The maximum level of calcium is up to 0.26% by weight for fruit juice beverages and typically up to about 0.15% for other beverages. As the level of calcium in fruit juice beverages is increased much beyond 0.26% by weight (beyond 0.15% by weight for other beverages), satisfactory taste and stability properties become much more difficult to achieve. Preferably, the level of calcium in fruit juice beverages is from about 0.10 to 0.20% by weight which includes milk level, i.e., 0.12% by weight, and from about 0.055 to about 0.09% by weight for other beverages.

With regard to fruit juice concentrates used to prepare fruit beverages of the present invention, the amount of calcium present is from about 0.15% to about 130% by weight. For other beverage concentrates, the amount of calcium present is typically from about 0.15 to about 0.75% by weight. Typically, beverages of the present invention are prepared from 3-fold (3X) to 5-fold (5X) beverage concentrates. Accordingly, the level of solubilized calcium is preferably in the range of from about 0.3 to about 1% by weight for fruit juice concentrates and from about 0.16 to about 0.45% by weight for other beverage concentrates.

A key component for drinkable beverages and beverage concentrates of the present invention from the standpoint of stability against precipitation of insoluble calcium salts, taste/mouthfeel/after taste quality and desirable onset of sourness is the edible acid component (added acids or from juice). This acid component comprises one or more edible acids, which can include phosphoric acid, citric acid, malic acid, fumaric acid, adipic acid, lactic acid, tartaric acid, gluconic acid or mixtures thereof. These acids can be present in their undisassociated form or else as the respective sour salts, i.e. phosphate, hydrogen phosphate, dihydrogen phosphate, citrate, malate, tartrate, gluconate and lactate. Particularly preferred edible acid systems comprise phosphoric acid, citric acid, malic acid, gluconic acid or combinations thereof.

For the purposes of the present invention, the level of the acid component (hereafter total acids) depends on the beverage composition involved, the level of calcium included, as well as the mouthfeel, taste and stability properties desired. The fruit juice beverages having from about 0.05 to about 0.26% by weight solubilized calcium, the level of total acids can range from about 0.4 to about 4% by weight. (For fruit juice concentrates used to prepare such beverages, the level of total acids can range from about 1.2 to about 20% by weight). For other beverages having from about 0.05 to about 0.15% by weight solubilized calcium, the level of total acids can range from about 0.07 to about 1% by weight. (For beverage concentrates used to prepare such beverages, the level of total acids can range from about 0.2 to about 5% by weight.) For preferred fruit beverages having from about 0.10 to about 0.20% by weight solubilized calcium, the level of total acids preferbly ranges from 0.6 to 2% by weight (from about 1.8 to about 10% by weight for fruit juice concentrates used to prepare these fruit juice beverages). For other preferred beverages having from about 0.055 to about 0.09% by weight solubilized calcium, the level of total acids preferably ranges from 0.1 to 0.6% by weight (from about 0.3 to about 3% by weight for beverage concentrates used to prepare these beverages).

An important component for the beverages and beverage concentrates of the present invention is the level of sulfate present. Inclusion of low levels of sulfate (preferably in combination with low levels of chloride) in beverages of the present invention has been found to have several particularly important effects. One is to cause a quicker onset of sourness in certain beverages, especially those beverages having from about 0.055 to about 0.09% by weight solubilized calcium. This is believe to be due to a reduction in the buffering capacity of the edible acids present. (Chloride is also believed to aid the quicker onset of sourness due to a taste mechanism interaction.) Another important effect is improving the solubility of calcium in the beverage/concentrate, even where high levels of citric or phosphoric acid are used. This is also believed to be due to a reduction in the buffering capacity of the edible acids present. Another benefit is a reduction in aftertaste effects, particularly the "biting/burning" aftertaste associated with calcium-fortified beverages containing phosphoric acid. This aftertaste is believed to be due to delayed precipitation of calcium phosphate in the mouth. The reduction in aftertaste due to sulfate/chloride inclusion is believed to be the result of reduced calcium-phosphate interactions due to the reduction in pH.

For fruit juice beverages having from about 0.05 to about 0.26% by weight solubilized calcium, the level of sulfate can range from about 0.02 to about 0.1% by weight, while the level of chloride can range up to about 0.07% by weight. (For fruit juice concentrates used to prepare such beverages, the level of sulfate can range from about 0.06 to about 0.5% by weight, while the level of chloride can range up to about 0.35% by weight.) For other beverages having from about 0.05 to about 0.15% by weight solubilized calcium, the level of sulfate can range from about 0.02 to about 0.14% by weight, while the level of chloride can range up to about 0.05%. (For beverage concentrates used to prepare these other beverages, the level of sulfate can range from about 0.06 to about 0.7% by weight, while the level of chloride can range up to about 0.25% by weight.) At sulfate levels much about 0.10% by weight, or chloride levels much above 0.07% by weight, in juice beverages (above 0.14% by weight or 0.05% by weight, respectively, in other beverages), the sulfate and chloride concentrations are sufficiently high to cause a noticeable salty/brackish note which is considered undesirable. At sulfate levels much below 0.02% by weight, the effect of sulfate on sourness, aftertaste and improved solubility of calcium is significantly minimized. In addition, the amount of sulfate and chloride combined should be no more than about 0.12% by weight for fruit juice beverages of the present invention, and no more than about 0.6% by weight for fruit juice concentrates. For other beverages, the combined amount of sulfate and chloride should be no more than about 0.14% by weight (preferably no more than about 0.10% by weight), and no more than about 0.7% by weight (preferably no more than 0.5% by weight) for beverage concentrates used to prepare these beverages.

Sources of sulfate and chloride for inclusion in beverages and beverage concentrates of the present invention can be from sulfuric acid or hydrochloric acid, or salts such as calcium sulfate and calcium chloride. Preferably, the sulfate and chloride are derived from calcium sulfate and calcium chloride, which also serve as at least partial sources of calcium. Calcium sulfate and calcium chloride combined can supply from about 3.2 to 100% by weight of the solubilized calcium for fruit juice beverages/concentrates and from about 5.6 to 100% by weight of the solubilized calcium for other beverages/concentrates. Preferably, calcium sulfate and calcium chloride combined supply from about 4.2 to about 60% of the solubilized calcium present in fruit juice beverages/concentrates and from about 9.3 to 89% of the solubilized calcium present in other beverages/concentrates.

C. Other Components of Beverages and Beverage Concentrates

1. Fruit Juice Beverages and Juice Concentrates

The fruit juice beverages and juice concentrates of the present invention also contain the sugars normally present in fruit juice products. These sugars include sucrose, fructose, high fructose corn syrup, glucose, invert sugar, and mixtures thereof. The amount of sugar naturally present in fruit juices is usually sufficient for the calcium-supplemented fruit juice beverages and juice concentrates of the present invention. However, in the case of extended juice products, sugar is typically added, usually in the form of sucrose or high fructose corn syrup.

In addition to sugar, extended fruit juice beverages of the present invention can contain other swenteners. Other suitable sweeteners include succharin, cyclamates, acetosulfam, L-aspartyl-L-phenylalanine lower alkyl ester sweeteners (e.g. aspartame), L-aspartyl-D-alanine amides disclosed in U.S. (Pat. No. 4,411,925 to Brennan et al, issued Oct. 23, 1983 (herein incorporated by reference), L-aspartyl-D-serine amides disclosed in U.S. Pat. No. 4,399,163 to Brennan et al, issued Aug. 16, 1983 (herein incorporated by reference), L-aspartyl-L-1-hydroxymethylalkaneamide sweeteners disclosed in U.S. Pat. No. 4,338,346 to Brand, issued Dec. 21, 1982 (herein incorporated by reference), L-aspartyl-1-hydroxyethylalkaneamide sweeteners disclosed in U.S. Pat. No. 4,423,029 to Rizzi, issued Dec. 27, 1983 (herein incorporated by reference), L-aspartyl-D-phenylglycine ester and amide sweeteners disclosed in European patent application No. 168,112 to J. M. Janusz, published Jan. 15, 1986 (herein incorporated by reference), and the like. A particularly preferred sweetener for use in such extended juice products is aspartame.

For single-strength fruit juice beverages, the sugar content can range from about 2° to about 16° Brix. Typically, the sugar content of such beverages depends upon the amount of fruit juice contained therein. For full-strength beverages containing at least about 95% fruit juice, the sugar content is typically from about 5 to about 14° Brix. For extended juice beverages which comprise from about 50 to about 90% fruit juice, the sugar content is typically from about 5° to about 13° Brix (no other sweetener) or from about 2° to about 8° Brix (other sweetener containing).

For fruit juice concentrates according to the present invention, the sugar content can range from about 6° to about 75° Brix. Typically, th sugar content of these juice concentrates is from about 20° to about 50° Brix. For orange juice concentrates, the sugar content is preferably from about 35° to about 50° Brix.

The fruit juice beverages and juice concentrates of the present invention are typically substantially free of added protein. Examples of such proteins include soy protein, whey protein concentrate, and the like. These proteins can react with fruit juice aromas and flavors and, if hydrolyzed, can form short-chain peptides or amino acids which have undesirable bitter flavors. For fruit juice beverages of the present invention, the amount of added protein is generally no more than about 0.1% by weight. Preferably, these beverages and concentrates contain no added protein.

Other optional ingredients typically present in fruit juice products can be included in the beverages and concentrates of the present invention. For example, preservatives, vitamins and other minerals can be included. Suitable vitamins include A, D, E, C (ascorbic acid), $B_1$ (thiamin), $B_2$ (riboflavin), $B_6$, $B_{12}$, niacin, folic acid and biotin. Other minerals besides calcium which can be included are iron, zinc, potassium, magnesium, manganese and copper. If desired, natural and synthetic flavorings and colorings can be included in these beverages and concentrates.

2. Other Beverages and Beverage Concentrates a. Flavor Component

Other beverages and beverage concentrates of the present invention typically comprise a flavor component which contains a flavor selected from fruit flavors, botanical flavors and mixtures thereof. As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else synthetically prepared.

As used herein, the term "botanical flavor" refers to flavors derived from parts of a plant other than the fruit. As such, botanical flavors can include those flavors derived from nuts, bark, roots and leaves. Also included within the term "botanical flavor" are synthetically prepared flavors made to simulate botanical flavors derived from natural sources. Examples of such flavors include kola flavors, tea flavors, and the like. These botanical flavors can be derived from natural sources such as essential oils and extracts, or else can be synthetically prepared.

The flavor component can comprise a blend of various flavors, e.g. lemon and lime flavors, kola flavors with citrus flavors to form cola flavors, etc. If desired, fruit juices such as orange juice, lemon juice, lime juice, apple juice, grape juice and the like can be used in the flavor component. The flavors in the flavor component are sometimes formed into emulsion droplets which are then dispersed in the beverage concentrate. Because these droplets usually have a specific gravity less than that of water and would therefore form a separate phase, weighting agents (which can also act as clouding agents) are typically used to keep the emulsion droplets dispersed in the beverage. Examples of such weighting agents are brominated vegetable oils (BVO) and rosin esters, in particular the ester gums. See L. F. Green, *Developments in Soft Drinks Technology*, Vol. 1, (Applied Science Publishers Ltd. 1978), pp. 87–93 (herein incorporated by reference), for a further description of the use of weighting and clouding agents in liquid beverages. Besides weighting agents, emulsifiers and emulsion stabilizers can be used to stabilize the emulsion droplets. Examples of such emulsifiers and emulsion stabilizers include the gums, pectins, celluloses, polysorbates, sorbitan esters and propylene glycol alginates. See L. F. Green, supra at p. 92.

The particular amount of the flavor component effective for imparting flavor characteristics to the beverages and beverage concentrates of the present invention ("flavor enhancing") can depend upon the flavor(s) selected, the flavor impression desired, and the form of the flavor component. For flavor components which are substantially free of fruit juice, i.e., on a single-strength basis, no more than about 1% fruit juice by weight of the beverage, the flavor component can comprise at least about 0.05% by weight of the beverage composition, and typically from about 0.1 to about 2% by weight for carbonated beverages. When fruit juices are used, the flavor component can comprise, on a single-strength basis, up to about 40% fruit juice by weight of the beverage, preferably from about 5 to about 15% fruit juice by weight for carbonated beverages.

b. Sweeteners

Beverages and beverage syrups of the present invention contain a sweetener. The sweetener typically used is sugar. As used herein, the term "sugar" refers to mono- and di-saccharide sweeteners. Examples of such sugars include sucrose, glucose, fructose, high fructose corn syrup, invert sugar and the like. Preferred sugars are sucrose and high fructose corn syrup. Sugars, especially high fructose corn syrup, have been found to enhance the absorbability/bioavailability of calcium from beverages of the present invention.

For diet beverages, noncaloric sweeteners can be used. Examples of such sweeteners include saccharin, cyclamates, acetosulfam, L-aspartyl-L-phenylalanine lower alkyl ester sweeteners, L-aspartyl-D-alanine amides disclosed in U.S. Pat. No. 4,411,925 to Brennan et al., issued Oct. 23, 1983 (herein incorporated by reference), L-aspartyl-D-serine amides disclosed in U.S. Pat. No. 4,399,163 to Brennan et al., issued Aug. 16, 1983 (herein incorporated by reference), L-aspartyl-L-1-hydroxymethylalkaneamide sweeteners disclosed in U.S. Pat. No. 4,338,346 to Brand, issued Dec. 21, 1982 (herein incorporated by reference), L-aspartyl-1-hydroxyethylalkaneamide sweeteners disclosed in U.S. Pat. No. 4,423,029 to Rizzi, issued Dec. 27, 1983 (herein incorporated by reference), and the like. The acid systems of the present invention can provide improved hydrolytic stability for beverages containing L-aspartyl-L-phenylalanine ester (e.g. aspartame) sweeteners in the critical pH range of from about 4.0 to about 4.8.

The amount of the sweetener effective in the beverages of the present invention depends upon the particular sweetener(s) used and the sweetness intensity desired. For noncaloric sweeteners, this amount varies depending upon the sweetness intensity of the particular sweetener. For sugar, this amount can be from about 1 to about 14% (typically from about 6 to about 14%) by weight for carbonated beverages. Preferred beverages contain from about 9 to about 13% by weight sugar. (In determining the amount of sugar for beverages of the present invention, any sugar or other sweetener present in the flavor component, such as in fruit juice, is also included.) Low-calorie sweetener combinations containing a noncaloric sweetener such as aspartame and a sugar such as high fructose corn syrup can also be used in beverages of the present invention. For beverage syrups of the present invention, the amount of sugar is significantly higher. Usually, the amount of sugar in a beverage syrup is from about 30 to about 70% by weight. Preferably, such beverage syrups contain from about 40 to about 60% by weight sugar.

The beverages, beverage concentrates and beverage syrups of the present invention are typically substantially free of a sugar alcohol, i.e. less than about 1% by weight. The sugar alcohols include sorbitol, mannitol and xylitol. Sugar alcohols are sometimes used as sweeteners for food products. However, these sugar alcohols, which are noncaloric, are also metabolized by lower gut flora, causing flatulence and related gastrointestinal (GI) tract problems such as diarrhea. Accordingly, at the levels required to sweeten beverages, sugar alcohols are not particularly useful in the present invention.

c. pH and Other Beverage Ingredients

The pH of other beverages and beverage concentrates of the present invention is dependent upon the particular composition of the acid component, the total amount of acids used and the sourness impression desired. Typically, the pH can range from about 2.5 to about 5.0. Preferred carbonated beverages have a pH of from about 2.5 to about 4.5.

Other minor beverage ingredients are frequently included in beverages and concentrates. Such ingredients include preservatives such as benzoic acid and salts thereof, sulfur dioxide, etc. Also, typically included are colors derived either from natural sources or synthetically prepared. See L. F. Green, *Developments in Soft Drinks Technology*, Vol. 1 (Applied Science Publishers Ltd. 1978), pp. 185–186 (herein incorporated by reference) for preservatives and colors used in beverages.

D. Preparation of Beverages and Beverage Concentrates

1. Fruit Juice Beverages and Juice Concentrates

Calcium sulfate, and calcium chloride and/or calcium gluconate, usually do not supply 100% of the solubilized calcium for calcium-supplemented fruit juice beverages and juice concentrates of the present invention. Other calcium sources, in particular, calcium hydroxide, calcium oxide and calcium carbonate, are typically used in addition to calcium sulfate, and calcium chloride and/or calcium gluconate. These other calcium sources are preferably included in these fruit juice beverages and juice concentrates by using what is referred to hereafter as a premix method. The following discussion of this method will generally be with regard to formation of orange juice beverages and juice concentrates, which are highly preferred fruit juice products according to the present invention. However, this method can also be used to preparre calcium-supplemented fruit juice products based on other citrus juices such as grapefruit juice, noncitrus juices such as apple juice, as well as mixtures of juices.

In this premix method, an acid component comprising citric acid and malic acid is typically dissolved in the appropriate quantity of water. (If desired, fruit juice or concentrated fruit juice such as lemon juice can be used to supply a portion of the acids). Generally, this acid component comprises from 0 to about 90% by weight citric acid and from about 10 to 100% by weight malic acid. For orange juice, this acid component typically comprises from about 5 to about 90% by weight citric acid and from about 10 to about 95% by weight malic acid. Preferably, this acid component comprises from about 5 to about 60% by weight citric acid and from about 40 to about 95% by weight malic acid. (For noncitrus juices such as apple juice, this acid component typically comprises from about 5 to about 80% by weight citric acid and from about 20 to about 95% by weight malic acid, and preferably comprises from about 20 to about 50% by weight citric acid and from about 50 to about 80% by weight malic acid.) As a rule, the ratio of these acids is selected to provide optimum flavor character in the juice.

Once the solution containing jthe dissolved acids is formed, the calcium hydroxide, calcium oxide or calcium carbonate is then added. The weight ratio of total acids to calcium added in the solution is typically from about 0.5 to about 12. Preferably, this weight ratio is from about 1 to about 6.

Addition of calcium carbonate, calcium oxide, or calcium hydroxide to the aqueous solution of acids provides a premix containing an at least meta-stable solution of solubilized calcium. This is due to the fact that highly soluble calcium citrate and malate species such as $CaHcitrate$, $Ca(H_2citrate)_2$, and $CaHmalate$ are formed in the solution due to the reaction between the calcium source and the acids. Without added stabilizers, the highly soluble calcium citrate species are stable in the premix solution for periods up to only about a few hours. After this short period of time, the highly soluble citrate species tend to disproportionate to the corresponding acid and the more thermodynamically stable, insoluble calcium citrate salts, such as $Ca_3citrate_2$.

To improve the stability of the calcium malate and especially citrate species in the premix solution, it is preferred to include a premix stabilizer. Materials which can complex with calcium and/or act as crystallization inhibitors are useful as premix stabilizers. These materials include sugars, such as sucrose, glucose, fructose, high fructose corn syrup, invert sugar, and polysaccharides such as pectin, algins, hydrolyzed starches, xanthan gum, and other edible gums. Concentrated juices which naturally contain both sugars and polysaccharides are particularly suitable premix stabilizers. Preferred premix stabilizers are sucrose and high fructose corn syrup (especially for extended juice products) and concentrated orange juice having a sugar content of from about 35° to about 80° Brix whose source is described hereafter.

The premix stabilizer can be added immediately after the calcium source is added to the aqueous solution containing the acids. (When calcium carbonate is the calcium source, carbon dioxide evolution is preferably allowed to substantially cease before the premix stabilizer is added). However, if desired, the premix stabilizer (especially in the case of sugars and concentrated juice) can be added to the aqueous solution of the acids prior to addition of the calcium source. The amount of premix stabilizer included in the premix solution typically depends upon the stabilizer used. When sugars are used as the premix stabilizer, they are typically added in an amount sufficient to provide a sugar content of from about 2° to about 40° Brix. When polysaccharides are used, the amount can vary widely, but is typically from about 0.01 to about 0.5% on a weight/volume basis. When concentrated juice is used as the premix stabilizer, it is typically included in an amount sufficient to provide a sugar content of from about 2° to about 12° Brix (preferably from about 2 to about 6° Brix).

The premix solution of solubilized calcium is typically prepared in a batch-type fashion, as in the description above, at room temperature. However, this premix solution can also be prepared in a continuous fashion. In this continuous method, the ingredients (water, acids, calcium source and optional premix stabilizer) are constantly metered together to form the premix solution. The level at which the ingredients are metered is adjusted, as necessary, to insure appropriate solubilization of the calcium in the premix solution and to provide the appropriate acidity.

The premix solution containing the solubilized calcium is combined in a mix tank with chilled (e.g., below about 40° F. (4.4° C.)) concentrated orange juice having a sugar content of from about 35° to about 80° Brix (preferably from about 60° to about 70° Brix.), orange juice aroma and flavor volatiles, plus other orange juice materials such as pulp and peel oils, to provide the calcium-supplemented orange juice products. The particular proportions of premix solution, concentrated juice, aroma and flavor valatiles, pulp and peel oils used will depend upon a number of different factors, including the degree of calcium supplementation desired and the type of orange juice product involved (single-strength juice beverage or juice concentrate). Calcium sulfate, and calcium chloride and/or calcium gluconate, can also be added to the mix tank or else can be included in the premix solution. After the calcium-supplemented orange juice product is obtained, it is then filled into cans, cartons, bottles or other appropriate packaging. In the case of calcium-supplemented orange juice concentrates, these products are typically frozen after being filled into cans.

Inclusion of calcium sulfate and calcium chloride in calcium-containing fruit juice beverages helps in reducing or preventing the precipitation of calcium salts (especially calcium citrate) on equipment surfaces during pasteurization or sterilization. It has been surprisingly found that, as a calcium-containing fruit juice stream passes through pasteurization or sterilization equipment, the calcium salts present in the juice stream precipitate out at the high temperatures (e.g., from about 220° to about 300° F.) required for pasteurization or sterilization. These precipitated calcium salts typically deposit on the equipment surface of the pasteurizer or sterilizer and eventually flake off into the finished product stream. Pasteurization or sterilization equipment in which such precipitation problems can occur include ultra-high temperature direct steam infusion sterilizers such as the Crepaco Ultratherm Infusion Heater.

The concentrated orange juice, orange juice aroma and flavor volatiles, pulp and peel oils used in the method of the present invention can be obtained from standard orange juice processing. See Nagy et al., *Citrus Science and Technology*, Volume 2, (AVI Publishing Co. 1977), pp 177–252 (herein incorporated by reference) for standard processing of oranges, grapefruit and tangerines. (See also Nelson et al, *Fruit & Vegetable Juice Processing Technology* (3rd Ed., AVI Publishing 1980), pp. 180–505 (herein incorporated by reference) for standard processing of noncitrus juices such as apple juice, grape juice, pineapple juice, etc. to provide sources of juice and juice materials for calcium-supplemented noncitrus juice products.) Fresh juice is extracted from the oranges, principally of the Valencia type. (The peel of the oranges is initially rasped to provide peel oils which can be used in the method of the present invention). Juices from different oranges are frequently blended to adjust the sugar to acid ratio. A sugar to acid ratio of from about 8:1 to about 20:1 is considered acceptable. However, preferred sugar to acid ratios are typically from about 11:1 to about 15:1.

Juice is extracted from the oranges by using automatic juicing machines, or less often by hand squeezing of the oranges. The type of equipment used to extract the juice is not critical. The raw juice exiting from the squeezing device contains pulp, rag and seeds. The rag and seed are separated from the juice and pulp in a finisher. The juice is then typically separated into a pulp portion and a serum portion. (The pulp portion can be used as a source of pulp in the method of the presnt invention).

The serum portion can be concentrated by a variety of techniques which typically include evaporative concentration or freeze concentration. In evaporative concentration, the serum portion of the juice is passed through an evaporator (e.g. falling film or temperature accelerated short time evaporator (TASTE) type). Water vapor, as well as the aroma and flavor volatiles, are stripped from the juice. These stripped volatiles are then centrifuged to provide an upper layer (essence oils) and a lower layer (aqueous essence). (A portion of these essence oils and aqueous essence are typically used as the source of orange juice aroma and flavor volatiles for the method of the present invention). The remaining stripped juice is then concentrated in the evaporator (by heat) to the appropriate amount of solids as measured by the sugar content of the concentrated juice. This concentrated juice can then be used in the method of present invention.

Most concentrated orange juices are obtained by evaporative concentration. However, freeze concentration can also be used to obtain concentrated orange juice useful in the method of the present invention. Freeze concentration typically involves passing the serum portion of the juice through a scraped wall heat exchanger to form substantially pure ice crystals which are then separated from the conventrated juice. A preferred freeze concentration method is disclosed in U.S. Pat. No. 4,374,865 to Strobel, issued Feb. 22, 1983, which is incorporated by reference. Unlike evaporative concentration, concentrated orange juice obtained by freeze concentration typically contains the aroma and flavor volatiles as well.

2. Other Beverages and Beverage Concentrates

The other beverages and concentrates of the present invention can be prepared by standard beverage formulation techniques. Although noncarbonated beverages are within the scope of the present invention, particular emphasis is given to the making of carbonated beverages. It should be understood, however, that carbonated beverage making techniques, when appropriately modified, are also applicable to noncarbonated beverages. Also, while the following description is with reference to sugar containing beverages, diet beverages containing noncaloric sweeteners can also be prepared by appropriate modification.

In making a sugar-sweetened carbonated beverage, a beverage concentrate is usually formed. This beverage concentrate typically contains the emulsified or water-soluble flavors, emulsion stabilizing agents, and weighting agents if needed, any color desired and suitable preservatives. After the concentrate is formed, sugar and water are then added to make a beverage syrup. This beverage syrup is then mixed with an appropriate quantity of water to form the finished beverage. The weight ratio of water:syrup is from about 2:1 ($3\times$ syrup) to about 4:1 ($5\times$ syrup). Carbon dioxide can be introduced either into the water mixed with the beverage syrup or into the drinkable beverage to achieve carbonation. The carbonated beverage can then be placed in a container such as a bottle or can and then sealed. See L. F. Green, *Developments in Soft Drinks Technology*, Vol. 1, (Applied Science Publishers Ltd. 1978), pp. 102–107 (herein incorporated by reference), for a further description of beverage making, in particular the process for carbonation.

The amount of carbon dioxide introduced into the beverage can depend upon the particular flavor system used and the amount of carbonation desired. Usually, carbonated beverages of the present invention contain from about 1.0 to about 4.5 volumes of carbon dioxide. Preferred carbonated beverages contain from about 2 to about 3.5 volumes of carbon dioxide.

The calcium source(s) (e.g. calcium carbonate, calcium sulfate and calcium chloride) and the acids (e.g., citric, malic, and phosphoric) can be added at various points in this beverage concentrate-beverage syrup-carbonated beverage making process. The calcium source and acids are preferably added at the same point in this process, but can also be added at different points. Usually, the calcium source and acids are included during preparation of the beverage concentrate or during preparation of the beverage syrup.

Specific Embodiments of Beverages, Beverage Concentrates and Methods for Making Same According to the Present Invention The following are specific embodiments of beverages, beverage syrups and method for making same in accordance with the present invention:

Embodiment 1

A cola-flavored beverage syrup was prepared from the following ingredients:

| Ingredient | Amount (g.) |
| --- | --- |
| Water | 242.7 |
| Calcium hydroxide | 0.416 |
| Calcium chloride dihydrate | 0.80 |
| Calcium sulfate dihydrate | 1.94 |
| Phosphoric acid (85%) | 2.144 |
| High fructose corn syrup 55 | 224.0 |
| Cola flavor and caramel | 8.0 |
| Total | 480.0 |

The ingredients were mixed together to form the syrup. The syrup was added to 10 oz. bottles (90 g. of syrup in each bottle). The bottles were then cooled to 34° F. Carbonated water (4.95 volumes $CO_2$) was added to make a final volume in each bottle of 10 oz.

Embodiment 2

A lemon/lime-flavored beverage was prepared from the following ingredients:

| Ingredient | Amount (g.) |
| --- | --- |
| Water | 1283.5 |
| Calcium carbonate | 1.125 |
| Calcium sulfate | 0.765 |
| Calcium chloride dihydrate | 0.825 |
| Citric acid (anhydrous) | 3.75 |
| High fructose corn syrup 55 | 210.0 |
| Total | 1500 |

The above ingredients were mixed together and then 1.67 ml of lemon/lime flavor and 2.4 ml of color were added and mixed. The beverage was added to 16 oz. Bottles (477 g. in each bottle). The bottles were carbonated to 3.5 volumes $CO_2$. The beverage had a pH of 3.56.

Embodiment 3

A lemon/lime-flavored beverage was prepared from the following ingredients

| Ingredient | Amount (g.) |
| --- | --- |
| Water | 856.36 |
| Calcium hydroxide | 0.26 |
| Calcium chloride dihydrate | 0.50 |
| Calcium sulfate | 0.96 |
| Citric acid (anhydrous) | 1.30 |
| Malic acid | 0.62 |
| High fructose corn syrup 55 | 140.0 |
| Total | 1000 |

The above ingredients were mixed together and then added to 16 oz. bottles (about 500 g. in each bottle). To each bottle was added 0.53 ml of lemon/lime flavor and 0.76 ml of color. The bottles were then carbonated to 3.0 volumes $CO_2$.

For Embodiments 1 to 3, the level of calcium, total acids, sulfate and chloride in the beverage is shown in the following table:

| Embodiment | Calcium (%) | Total Acids (%) | Sulfate (%) | Chloride (%) |
| --- | --- | --- | --- | --- |
| 1 | 0.055 | 0.111 | 0.066 | 0.024 |
| 2 | 0.060 | 0.25 | 0.036 | 0.027 |
| 3 | 0.056 | 0.192 | 0.068 | 0.024 |

Embodiment 4

An acid/calcium mixture comprising 275 lbs. of tap water, 10.2 lbs. of malic acid, 0.59 lbs. of citric acid, 5.9 lbs. of calcium hydroxide and 2.89 lbs. of calcium sulfate one half hydrate was prepared in a stainless steel tank. In a separate blending tank, 450 lbs. of 65° Brix orange juice concentrate was blended with 1400 lbs. of water. The acid/calcium mixture was added to the large blending tank containing diluted concentrate. More water was then added to provide a juice solids content of 14° Brix. The calcium-containing juice mixture (2250 lbs.) was pasteurized using a Crepaco Ultratherm Infusion Heater at a temperature of 230° F. and at a rate of 22 lbs. of juice per minute. The residence time was 2 to 4 seconds in the Infusion Heater. The pH of pasteurized juice was 3.85. The inside wall of the Infusion Heater was inspected after the run. No precipitate or deposit of calcium salt was observed.

In a separate control run, an acid/calcium mixture comprising 275 lbs. of water, 12.75 lbs. of malic acid, 0.74 lbs. of citric acid and 7.38 lbs. of calcium hydroxide was added to the same orange juice concentrate. The diluted juice/acid/calcium mixture was pasteurized using the same Infusion Heater under the same processing conditions. The final pH of pasteurized juice was determined to be 4.15. Severe deposits of calcium salt was noticed inside the Infusion Heater after the run.

Both runs were prepared to deliver 300 mg. of calcium per 6 oz. of juice.

Embodiment 5

An acid premix containing 275 lbs. of water, 7.6 lbs. of malic acid, 0.39 lbs. of citric acid, 5.2 lbs. of calcium hydroxide, 2.96 lbs. of calcium chloride dihydrate and 1.72 lbs. of calcium sulfate (anhydrous) was blended into a batch of orange juice as in Embodiment 4. The acid/calcium/juice mixture was pasteurized using a Crepaco Ultratherm Infusion Heater in the same manner as Embodiment 4. The final pH of the product was determined to be 3.65. No precipitate or deposit was observed inside the Infusion Heater after the run. This formula also delivered 300 mg. of calcium per 6 oz. of juice.

Embodiment 6

An acid/calcium mixture comprising 300 lbs. of distilled water, 10.2 lbs. of malic acid, 0.59 lbs. of citric acid, 5.9 lbs. of calcium hydroxide, 4.25 lbs. of calcium gluconate and 1.46 lbs. of calcium sulfate one half hydrate was blended into a batch of orange juice as in Embodiment 4. Sufficient water was then added to provide a juice solids content of 14.2° Brix. The acid/calcium/juice mixture was then pasteurized as in Embodiment 4. The final pH of this product was 3.70. No precipitate or deposit was observed inside the Infusion Heater after the run. The product delivered 300 mg of calcium per 6 oz. of juice. The flavor of the pasteurized juice was judged to be equal to a regular orange juice (without calcium salts) by untrained panelists.

What is claimed is:

1. A calcium-supplemented beverage, which comprises:
    (a) from about 0.05 to about 0.15% by single-strength beverage weight solubilized calcium;
    (b) from about 0.07 to about 1% by single-strength beverage weight of an edible acid component;

(c) from about 0.02 to about 0.14% by single-strength beverage weight sulfate;
(d) up to about 0.05% by single-strength beverage weight chloride;
(e) the amount of sulfate and chloride combined being up to about 0.14% by single-strength beverage weight;
(f) an effective amount of a flavor component;
(g) an effective amount of a sweetener; and
(h) a total single-strength beverage water content of at least about 80% by single-strength beverage weight.

2. The beverage of claim 1 which comprises from about 0.055 to about 0.09% by single-strength beverage weight of said solubilized calcium, from about 0.1 to about 0.6% by single-strength beverage weight of said acid component and up to about 0.10% by single-strength beverage weight sulfate and chloride combined.

3. The beverage of claim 2 wherein said acid component comprises citric acid, malic acid, phosphoric acid or mixtures thereof.

4. The beverage of claim 1 wherein said sweetener comprises from about 6 to about 14% by single-strength beverage weight sugar.

5. The beverage of claim 4 wherein said sugar is high fructose corn syrup.

6. The beverage of claim 1 wherein said sweetener comprises a noncaloric sweetener.

7. The beverage of claim 6 wherein said noncaloric sweetener comprises aspartame.

8. The beverage of claim 1 which is carbonated with from about 1.0 to about 4.5 volumes of carbon dioxide.

9. The carbonated beverage of claim 8 which contains from about 2 to about 3.5 volumes of carbon dioxide.

10. The carbonated beverage of claim 9 wherein said flavor component comprises from about 5 to about 15% fruit juice by single-strength beverage weight of the beverage.

11. The carbonated beverage of claim 9 wherein said flavor component is substantially free of fruit juice.

12. A beverage concentrate in liquid form for preparing a drinkable, single-strength beverage, which comprises:
(a) from about 0.15 to about 0.75% by beverage concentrate weight solubilized calcium;
(b) from about 0.2 to about 5% by beverage concentrate weight of an edible acid component;
(c) from about 0.06 to about 0.7% by beverage concentrate weight sulfate;
(d) up to about 0.25% by beverage concentrate weight chloride;
(e) the amount of said sulfate and said chloride combined being up to about 0.7% by beverage concentrate weight;
(f) a flavor component; and
(g) water in an amount sufficient that said beverage concentrate provides upon dilution a single-strength beverage having a total water content of at least about 80% by single-strength beverage weight.

13. The concentrate of claim 12 wherein said acid component comprises citric acid, malic acid, phosphoric acid or mixtures thereof.

14. The concentrate of claim 13 which comprises from about 0.16 to about 0.45% by beverage concentrate weight of said solubilized calcium, from about 0.3 to about 3% by beverage concentrate weight of said acid component, and up to about 0.5% by beverage concentrate weight sulfate and chloride combined.

15. The concentrate of claim 12 which comprises from about 30 to about 70% by beverage concentrate weight water.

16. The concentrate of claim 15 which further comprises from about 30 to about 70% by beverage concentrate weight sugar.

17. The concentrate of claim 16 wherein said sugar is high fructose corn syrup.

18. A calcium-supplemented single-strength fruit juice beverage, which comprises:
(a) from about 0.05 to about 0.26& by single-strength fruit juice beverage weight solubilized calcium;
(b) from about 0.4 to about 4% by single-strength fruit juice beverage weight of an edible acid component;
(c) from about 0.02 to about 0.1% by single-strength fruit juice beverage weight sulfate;
(d) up to about 0.07% by single-strength fruit juice beverage weight chloride;
(e) the amount of sulfate and chloride combined being up to about 0.12% by single-strength fruit juice beverage weight;
(f) at least about 45% by single-strength fruit juice beverage weight fruit juice;
(g) a single-strength fruit juice beverage sugar content of from about 2° to about 16° Brix; and
(h) a total single-strength fruit juice beverage water content of at least about 80% by single-strength fruit juice beverage weight.

19. The beverage of claim 18 wherein said fruit juice is citrus juice.

20. The beverage of claim 19 wherein said citrus juice is orange juice.

21. The beverage of claim 20 wherein said orange juice comprises from about 50 to about 90% by single-strength fruit juice beverage weight of the beverage.

22. The beverage of claim 21 wherein said orange juice comprises from about 50 to about 70% by single-strength fruit juice beverage weight of the beverage.

23. The beverage of claim 22 which further comprises aspartame and wherein said sugar content is from about 2° to about 8° Brix.

24. The beverage of claim 20 wherein said orange juice comprises at least about 95% by single-strength fruit juice beverage weight of the beverage.

25. The beverage of claim 20 wherein said solubilized calcium from about 0.10 to about 0.20% by single-strength fruit juice beverage weight of the beverage and wherein said acid component comprises from about 0.6 to about 2% by single-strength fruit juice beverage weight of the beverage.

26. The beverage of claim 19 wherein said citrus juice is grapefruit juice.

27. The beverage of claim 18 wherein said fruit juice is apple juice.

28. The beverage of claim 18 wherein said acid component comprises a mixture of citric acid, malic acid and gluconic acid.

29. A calcium-supplemented fruit juice concentrate, which comprises:
(a) from about 0.15 to about 1.30% by fruit juice concentrate weight solubilized calcium;
(b) from about 1.2 to about 20% by fruit juice concentrate weight of an edible acid component;

(c) from about 0.06 to about 0.5% by fruit juice concentrate weight sulfate;
(d) up to about 0.35% by fruit juice concentrate weight chloride;
(e) the amount of said sulfate and said chloride combined being up to about 0.6% by fruit concentrate weight;
(f) at least about 45% by single-strength fruit juice beverage weight fruit juice;
(g) a fruit juice concentrate sugar content of from about 6° to about 75° Brix; and
(h) water in an amount sufficient that said fruit juice concentrate provides upon dilution a single-strength fruit juice beverage having a total water content of at least about 80% by single-strength fruit juice beverage weight.

30. The concentrate of claim 29 wherein said fruit juice is citrus juice.
31. The concentrate of claim 30 wherein said citrus juice is orange juice.
32. The concentrate of claim 31 which has been frozen.
33. The concentrate of claim 32 wherein said solubilized calcium comprises from about 0.3 to about 1% by weight of the concentrate and wherein said acid component comprises from about 1.8 to about 10% by weight of the concentrate.
34. The concentrate of claim 33 wherein said orange juice comprises at least about 95% of the concentrate.
35. The concentrate of claim 32 wherein said orange juice comprises from about 50 to about 90% of the concentrate.

* * * * *